(12) United States Patent
Hagiwara et al.

(10) Patent No.: US 8,151,779 B1
(45) Date of Patent: Apr. 10, 2012

(54) CONTROL DEVICE OF AN INTERNAL COMBUSTION ENGINE

(75) Inventors: Keisuke Hagiwara, Mishima (JP); Susumu Kojima, Susono (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 202 days.

(21) Appl. No.: 12/731,732

(22) Filed: Mar. 25, 2010

(51) Int. Cl.
*F02B 13/00* (2006.01)
*F02B 13/10* (2006.01)

(52) U.S. Cl. ....................................... 123/575

(58) Field of Classification Search .................. 123/1 A, 123/3, 557, 575, 576, 577, 578
See application file for complete search history.

(56) References Cited

U.S. PATENT DOCUMENTS

| 3,238,667 A * | 3/1966 | Remmert ......................... 47/1.7 |
| 2003/0159811 A1 * | 8/2003 | Nurmi ............................ 165/132 |

FOREIGN PATENT DOCUMENTS

JP      A-05-332152      12/1993

\* cited by examiner

*Primary Examiner* — Mahmoud Gimie
(74) *Attorney, Agent, or Firm* — Oliff & Berridge, PLC (57) ABSTRACT

Liquid ammonia is fed from an ammonia storage tank to a vaporizer where it is vaporized. Gaseous ammonia vaporized inside the vaporizer is on the one hand injected from an ammonia injector and on the other hand reformed by a reformer, then injected from a reformed gas injector. The amount of liquid ammonia fed into the vaporizer is made to become equal to the amount of ammonia fed into the combustion chamber in the form of gaseous fuel by control of the amount of feed of the liquid ammonia to the vaporizer.

9 Claims, 8 Drawing Sheets

CONTROL DEVICE OF AN INTERNAL COMBUSTION ENGINE

BACKGROUND OF THE INVENTION

1. Field of the Invention

The present invention relates to a control device of an internal combustion engine.

2. Description of the Related Art

In an internal combustion engine, in the past, the fuel used has mainly been fossil fuels. However, in this case, burning such fuels produces $CO_2$, which causes global warming. On the other hand, burning ammonia does not produce $CO_2$ at all. Thus, there is known an internal combustion engine made so as to use ammonia as fuel and not produce $CO_2$ (for example, see Japanese Patent Publication (A) No. 5-332152).

However, ammonia is harder to burn compared with fossil fuels. Therefore, when using ammonia as fuel, some sort of measure is required for making the ammonia easier to burn. Thus, in the above-mentioned internal combustion engine, exhaust heat is utilized to reform the ammonia so as to produce reformed gas comprised of hydrogen and nitrogen, the hydrogen in the produced reformed gas is stored in a hydrogen storing alloy, and the hydrogen stored in the hydrogen storing alloy is fed together with the ammonia in a combustion chamber so as to enable easier combustion even when using ammonia as fuel.

In this regard, to make the ammonia burn well, it is preferable to cause the ammonia stored in a liquid state to vaporize in the vaporizer and feed the vaporized gaseous ammonia into the engine intake passage or combustion chamber. In this case, to stably feed the gaseous ammonia into the engine intake passage or into the combustion chamber, it is necessary to suitably control the action of vaporization of the liquid ammonia in the vaporizer. However, the above-mentioned Japanese Patent Publication (A) No. 5-332152 does not suggest anything regarding this.

SUMMARY OF THE INVENTION

An object of the present invention is to provide a control device of an internal combustion engine capable of suitably controlling the action of vaporization of the liquid ammonia in the vaporizer.

In the present invention, there is provided a control device of an internal combustion engine designed to feed liquid ammonia from an ammonia storage tank into a vaporizer to make the liquid ammonia vaporize and to feed gaseous fuel comprised of ammonia vaporized in the vaporizer or gaseous fuel comprised of ammonia vaporized in the vaporizer and reformed gas obtained by reforming this ammonia into a combustion chamber to burn the gaseous fuel in the combustion chamber, wherein at least one of an amount of feed of the liquid ammonia into the vaporizer, a feed pressure of the liquid ammonia to the vaporizer, and a gas pressure in the vaporizer is adjusted based on an amount of feed of the gaseous fuel into the combustion chamber.

Summarizing the advantageous effects of the invention, by adjusting at least one of the amount of feed of the liquid ammonia into the vaporizer, the feed pressure of the liquid ammonia into the vaporizer, and the gas pressure in the vaporizer based on the amount of feed of gaseous fuel into the combustion chamber, it is possible to stably feed the gaseous fuel.

BRIEF DESCRIPTION OF THE DRAWINGS

These and other objects and features of the present invention will become clearer from the following description of the preferred embodiments given with reference to the attached drawings, wherein.

DESCRIPTION OF THE PREFERRED EMBODIMENTS

Figure 1:
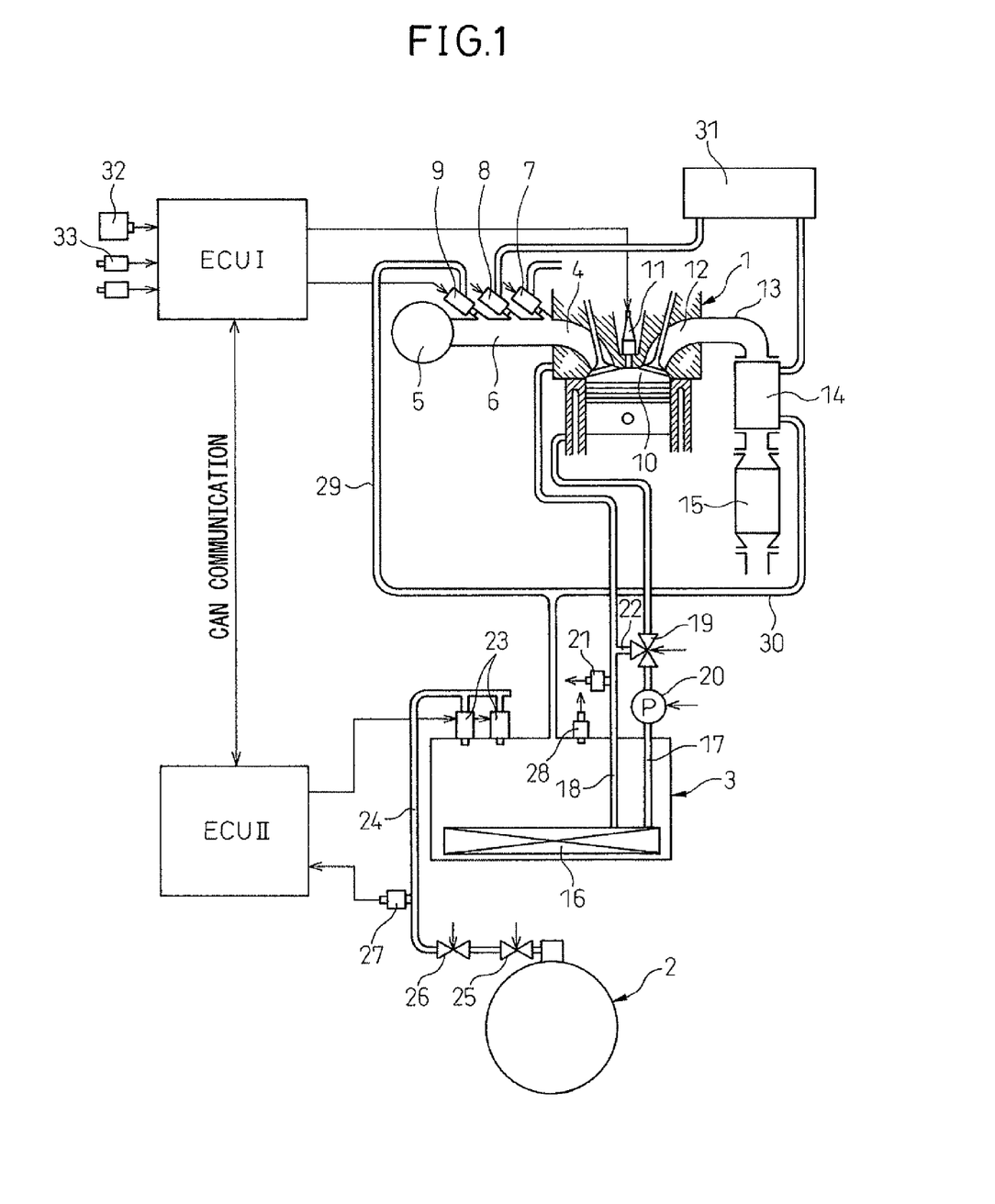
FIG. 1 is an overview of an internal combustion engine.

Referring to FIG. 1, 1 shows an engine body, 2 shows an ammonia storage tank storing liquid ammonia, and 3 shows a vaporizer. As shown in FIG. 1, inside an intake branch pipe 6 connecting an intake port 4 of each cylinder and a surge tank 5, a gasoline injector 7 for injecting gasoline, a reformed gas injector 8 for injecting reformed gas, and an ammonia injector 9 for injecting gaseous ammonia are arranged. The injectors 7, 8, and 9 feed the injected gasoline, reformed gas, and gaseous ammonia to the combustion chamber 10 where they are ignited and burned by a plasma jet spark plug 11. The exhaust port 12 of each cylinder is connected through an exhaust manifold 13 to an inlet of a reformer 14, while the outlet of the reformer 14 is connected to an exhaust purification catalyst 15.

On the other hand, at the bottom of the vaporizer 3, a heating device 16 is arranged. In this embodiment according to the present invention, this heating device 16 is comprised of a warm water heating device using engine cooling water for a heating action. This heating device 16 is provided with a warm water inflow passage 17 for guiding engine cooling water into the heating device 16 and a warm water return passage 18 for returning engine cooling water falling in temperature due to the heating action to the engine. Inside the warm water inflow passage 17, a flow path switching valve 19 and a warm water pump 20 for sending engine cooling water into the heating device 16 are arranged. Inside the warm water return passage 18, a temperature sensor 21 for detecting the temperature of the engine cooling water flowing out from the heating device 16 is arranged.

When performing a heating action by the heating device 16, the engine cooling water is made to flow into the heating device 16 by switching of the flow path switching valve 19 and drive of the warm water pump 20. As opposed to this, when making the heating action by the heating device 16 stop, the engine cooling water is made to run through a bypass passage 22, that is, to bypass the heating device 16, and be returned to the engine by switching of the flow path switching valve 19 and stopping of the warm water pump 20.

On the other hand, at the top part of the vaporizer 3, a plurality of vaporizer injectors 23 for injecting liquid ammonia toward the heating device 16 are attached. These vaporizer injectors 23 are connected through a liquid ammonia feed passage 24 to the ammonia storage tank 2. Inside this liquid ammonia feed passage 24, a tank on-off valve 25, pressure regulator 26, and pressure sensor 27 are arranged. The inside of the ammonia storage tank 2 is filled with 0.8 MPa to 1.0 MPa or so high pressure liquid ammonia. If the tank on-off valve 25 opens, the liquid ammonia in the ammonia storage tank 2 is guided into the vaporizer injectors 23.

From the vaporizer injectors 23, liquid ammonia is injected into the vaporizer 3 synchronously with the injection actions from for example the injectors 7, 8, and 9. The liquid ammonia injected into the vaporizer 3 is usually made to immediately vaporize by the heating action of the heating device 16. Therefore, the vaporizer 3 is filled with vaporized ammonia. Note that, the vaporizer 3 is provided with a pressure sensor 28 for detecting the gas pressure in the vaporizer 3.

The gaseous ammonia produced in the vaporizer 3 is on the one hand fed via a gaseous ammonia feed path 29 to the ammonia injector 9 and on the other hand fed via a gaseous ammonia feed path 30 to the reformer 14. When the temperature inside the reformer 14 becomes a temperature at which an ammonia reform action is performed or more, for example, several hundred degrees, the gaseous ammonia fed from the vaporizer 3 to the inside of the reformer 14 is broken down into hydrogen and nitrogen ($2NH_3 \rightarrow N_2 + 3H_2$), that is, is reformed. As a result, inside the reformer 24, reformed gas containing hydrogen is produced. The reformed gas produced in the reformer 14 is fed through a cooler 31 into the reformed gas injector 8.

On the other hand, as shown in FIG. 1, in this embodiment, an electronic control unit ECU I with a built-in computer for control of the engine and an electronic control unit II with a built-in computer for control of the vaporizer are provided. Between these electronic control units I and II, CAN communication is performed. The electronic control unit I receives as input an output signal of an intake air detector 32 showing the amount of intake air GA, an output signal of a speed sensor 33 showing an engine speed NE, etc. Due to the output signals of the electronic control unit I, the injectors 7, 8, and 9 and plasma jet spark plug 11 are operated. On the other hand, the electronic control unit II receives as input the output signal of the temperature sensor 21 and the output signals of the pressure sensors 27, 28. Due to the output signals of the electronic control unit II, the flow path switching valve 19, warm water pump 20, vaporizer injectors 23, tank on-off valve 25, and pressure regulator 26 are operated.

Now, in this embodiment according to the present invention, usually gaseous ammonia injected from the ammonia injector 9 and reformed gas injected from the reformed gas injector 8 are fed into each combustion chamber 10 and made to burn in the combustion chamber 10. However, when good combustion cannot be obtained by just gaseous ammonia and reformed gas, gasoline is fed in addition to gaseous ammonia and reformed gas or only gasoline is fed. Further, before the reform action by the reformer 14 is started, the feed of reformed gas is stopped. At this time, only gaseous ammonia, gaseous ammonia and gasoline, or only gasoline is fed.

In this embodiment according to the present invention, the fuel is burned under a stoichiometric air-fuel ratio. The amount of injection of gasoline required for making the air-fuel ratio the stoichiometric air-fuel ratio is stored as a function of the engine load and engine speed in advance in the electronic control unit I. Further, the amount of gaseous ammonia and the amount of reformed gas required for making the air-fuel ratio the stoichiometric air-fuel ratio is calculated from the stored amount of injection of gasoline.

In the example shown in FIG. 1, liquid fuel is injected from the gasoline injector 7, while gaseous fuel is injected from the ammonia injector 9 and reformed gas injector 8. In this case, if looking at the gaseous fuel, gaseous fuel comprised of ammonia vaporized in the vaporizer 3 or gaseous fuel comprised of ammonia vaporized in the vaporizer 3 and reformed gas obtained by reforming this ammonia is fed into the combustion chamber 10 and made to burn in the combustion chamber 10.

Figure 2:
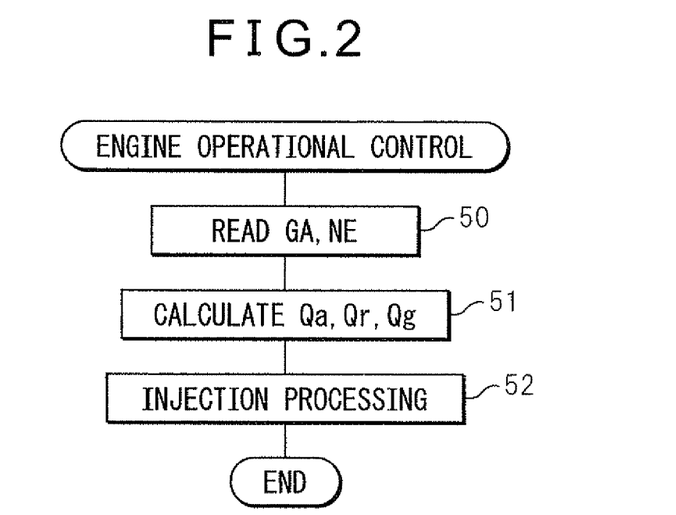
FIG. 2 is a flowchart for control of engine operation.

FIG. 2 shows an engine operational control routine performed at electronic control unit I. This routine is executed each time injection is performed at a cylinder. Referring to FIG. 2, first of all, at step 50, the amount of intake air GA and the engine speed NE are read. Next, at step 51, the injection ratio of the injection of ammonia from the ammonia injector 9, the injection of reformed gas from the reformed gas injector 8, and the injection of gasoline from the gasoline injector 7 is calculated in accordance with the operating state of the engine. The amount of ammonia injection $Q_a$ from the ammonia injector 9, the amount of reformed gas injection $Q_r$ from the reformed gas injector 8, and the amount of gasoline injection $Q_g$ from the gasoline injector 7 are calculated from this injection ratio and the prestored amount of injection of gasoline corresponding to the operating state of the engine. Next, at step 52, these are injected from the injectors 7, 8, and 9 in accordance with the calculated amounts of injection $Q_a$, $Q_r$ and $Q_g$.

Now, as explained above, in this embodiment according to the present invention, gaseous fuel comprised of ammonia vaporized in the vaporizer 3 or gaseous fuel comprised of ammonia vaporized in the vaporizer 3 and reformed gas obtained by reforming this ammonia is fed into the combustion chamber 10. In this case, if the amount of ammonia vaporized in the vaporizer 3 becomes larger than the amount of gaseous fuel fed into the combustion chamber 10, the amount of ammonia wastefully discharged from inside of the vaporizer 3 through a not shown safety valve into the engine exhaust passage ends up increasing. As opposed to this, if the amount of ammonia vaporized in the vaporizer 3 becomes smaller than the amount of gaseous fuel fed into the combustion chamber 10, the gas pressure inside the vaporizer 3 falls and the ammonia injector 9 and reformer 14 can no longer be fed ammonia.

In this case, to stably feed gaseous ammonia to the ammonia injector 9 and reformer 14, it is necessary to suitably control the action of vaporization of liquid ammonia in the vaporizer 3 in accordance with the amount of gaseous fuel fed into the combustion chamber 10. Thus, in the present invention, based on the amount of feed of the gaseous fuel to the combustion chamber 3, at least one of the amount of feed of the liquid ammonia to the vaporizer 3, the feed pressure of the liquid ammonia to the vaporizer 3, and the gas pressure in the vaporizer 3 is adjusted.

In this case, if the amount of liquid ammonia fed into the vaporizer 3 is made equal to the amount of ammonia fed into the combustion chamber 10 in the form of gaseous fuel, it is possible to stably feed gaseous fuel to the combustion chamber 10. Thus, in one embodiment of the present invention, the amount of liquid ammonia fed into the vaporizer 3 is made equal to the amount of ammonia fed into the combustion chamber 10 in the form of gaseous fuel by the amount of feed of the liquid ammonia to the vaporizer 3 to be controlled.

Figure 3:
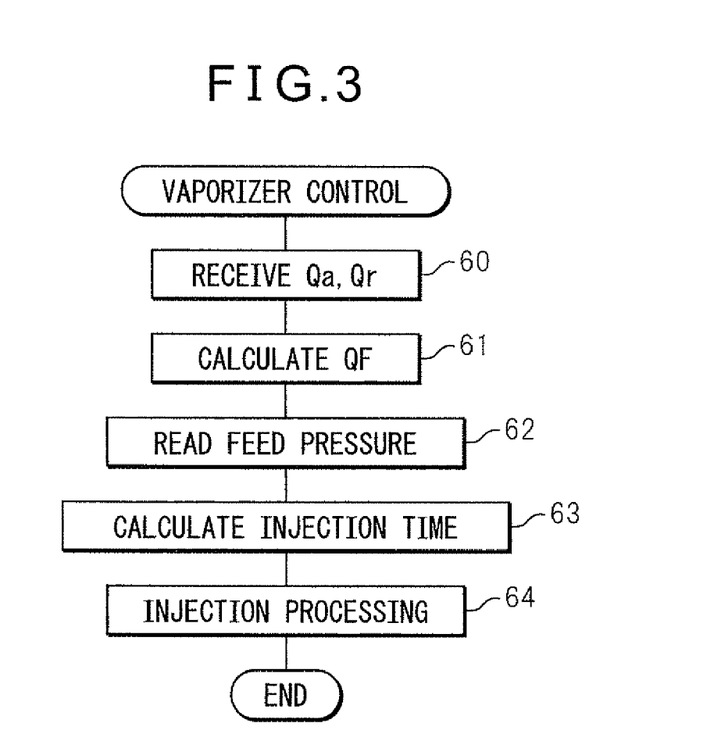
FIG. 3 is a flow chart showing an embodiment for control of a vaporizer.

FIG. 3 shows the vaporizer control routine performed in the electronic control unit II for working this embodiment. This routine is executed every time fuel is injected into a cylinder. Referring to FIG. 3, first of all, at step 60, the amount of gaseous ammonia injection $Q_a$ and the amount of reformed gas injection $Q_r$ calculated at step 51 of FIG. 2 are received. Next, at step 61, these amount of gaseous ammonia injection $Q_a$ and amount of reformed gas injection $Q_r$ are converted to the amount of liquid ammonia QF. Next, at step 62, the output of the pressure sensor 27 showing the feed pressure of the liquid ammonia 7 fed to the vaporizer injectors 23 is read. Next, at step 63, the injection time from the vaporizer injectors 23 is calculated from the amount of liquid ammonia QF and the liquid ammonia feed pressure. At the next step 64, this liquid ammonia is injected from the vaporizer injectors 23 in accordance with the injection time.

In the embodiment shown in FIG. 3, if the rate of vaporization of the liquid ammonia injected into the vaporizer 3 changes, the gas pressure inside the vaporizer 3 changes. Thus, in another embodiment, to maintain the gas pressure in the vaporizer 3 constant, the target pressure PX of the gas pressure $P_g$ in the vaporizer 3 is set in advance and the amount of liquid ammonia fed into the vaporizer 3 is controlled so that the gas pressure $P_g$ in the vaporizer 3 is made the target pressure PX.

Figure 4:
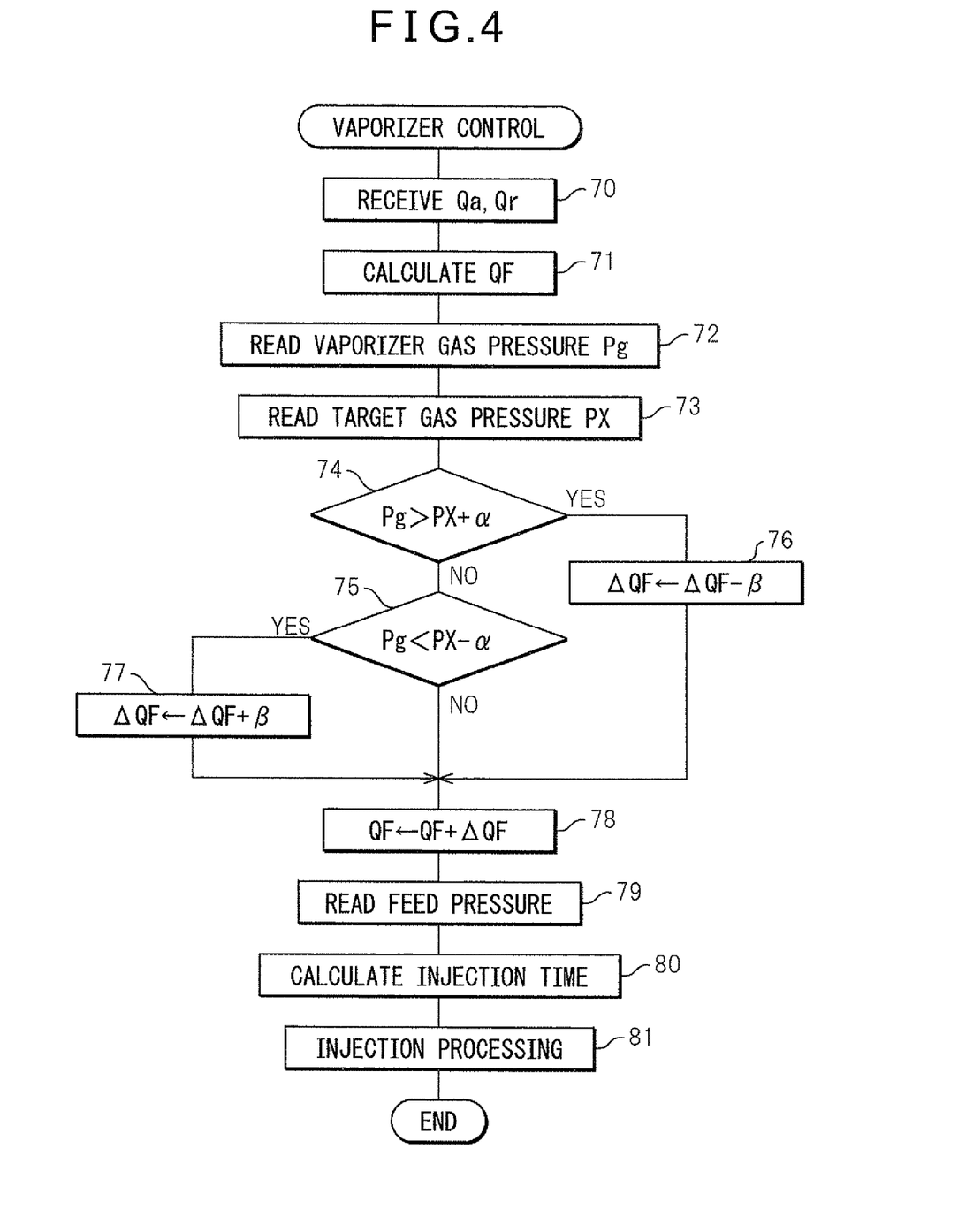
FIG. 4 is a flow chart showing another embodiment for control of a vaporizer.

FIG. 4 shows a vaporizer control routine performed in the electronic control unit II for working this other embodiment. This routine is executed every time fuel is injected into a cylinder. Referring to FIG. 4, first of all, at step 70, the amount of gaseous ammonia injection $Q_a$ and the amount of reformed gas injection $Q_r$ calculated at step 51 of FIG. 2 are received. Next, at step 71, the amount of gaseous ammonia injection $Q_a$ and the amount of reformed gas injection $Q_r$ are converted to the amount of liquid ammonia QF.

Next, at step 72, the output of the pressure sensor 28 showing the gas pressure $P_g$ in the vaporizer 3 is read. Next, at step 73, the target pressure PX of the gas pressure in the vaporizer 3 is read. In this embodiment, the target pressure PX is made a constant value, for example, 0.6 MPa. Next, at step 74, it is determined if the gas pressure $P_g$ is higher than the target pressure PX plus a small constant value α, that is, the value PX+α. When $P_g \leq PX+\alpha$, the routine proceeds to step 75 where it is determined if the gas pressure $P_g$ is lower than the target pressure PX minus the small constant value α, that is, the value PX-α. When $P_g \geq PX-\alpha$, the routine proceeds to step 78. As opposed to this, when it is determined at step 74 that $P_g>PX+\alpha$, the routine proceeds to step 76 where a correction amount ΔQF of the amount of liquid ammonia QF is reduced by a small constant value β. Next, the routine proceeds to step 78. On the other hand, when it is determined at step 75 that $P_g<PX-\alpha$, the routine proceeds to step 77 where the correction amount ΔQF is increased by the small constant value β. Next, the routine proceeds to step 78.

At step 78, the QF is increased by the correction amount ΔQF whereby the amount of liquid ammonia QF is calculated. Next, at step 79, the output of the pressure sensor 27 showing the feed pressure of the liquid ammonia 7 fed to the vaporizer injectors 23 is read. Next, at step 80, the injection time from the vaporizer injectors 23 is calculated from the amount of liquid ammonia QF and the liquid ammonia feed pressure calculated at step 78. At the next step 81, liquid ammonia is injected from the vaporizer injectors 23 in accordance with this injection time.

Figure 5:
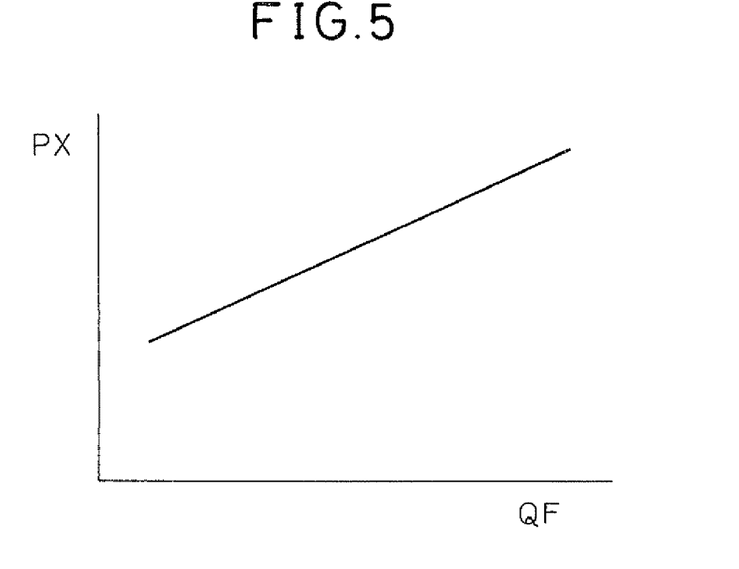
FIG. 5 is a view showing a target pressure PX.

FIG. 5 shows another embodiment. In this embodiment, the target pressure PX of the gas pressure read at step 73 of FIG. 4, as shown in FIG. 5, is made higher the more the amount of liquid ammonia QF increases, that is, the more the amount of feed of gaseous fuel to the fuel chamber 10 is increased. That is, the range over which the amount of injection from the ammonia injector 9 or reformed gas injector 8 can be controlled, that is, the dynamic range, is inherently limited. If the amount to be injected is increased, the injection time will become too long and injection will become impossible, while if the amount to be injected becomes small, the injection time will become too short and precise injection will no longer be possible.

However, as shown in FIG. 5, if the target pressure PX is made to increase when QF increases, that is, when the amount of feed of gaseous fuel into the combustion chamber 10 increases, the injection time can be made shorter and therefore the required gaseous fuel can be precisely injected. On the other hand, if the target pressure PX is made to decrease when QF becomes smaller, that is, when the amount of feed of gaseous fuel into the combustion chamber 10 becomes smaller, the injection time can be made longer and therefore the required gaseous fuel can be preciously injected. That is, the dynamic range of the ammonia injector 9 and reformed gas injector 8 can be enlarged.

Figure 6:
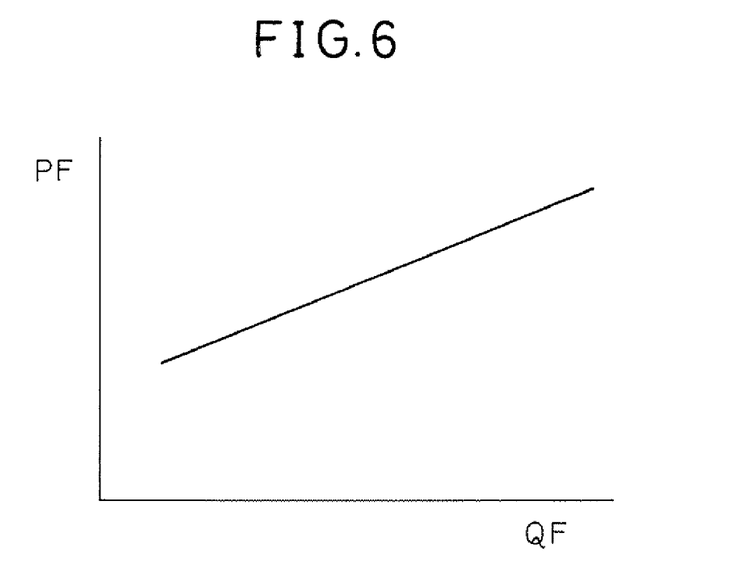
FIG. 6 is a view showing a target pressure PF.

FIG. 6 shows still another embodiment. In this embodiment, to enlarge the dynamic range of the vaporizer injectors 23, when the amount of liquid ammonia QF is large, the feed pressure of the liquid ammonia to the vaporizer injectors 23 is made higher, while when the amount of liquid ammonia QF is small, the feed pressure of the liquid ammonia is made lower. That is, as shown in FIG. 6, the greater the amount of liquid ammonia QF, the higher the target pressure PF of the feed pressure of the liquid ammonia is made.

Figure 7:
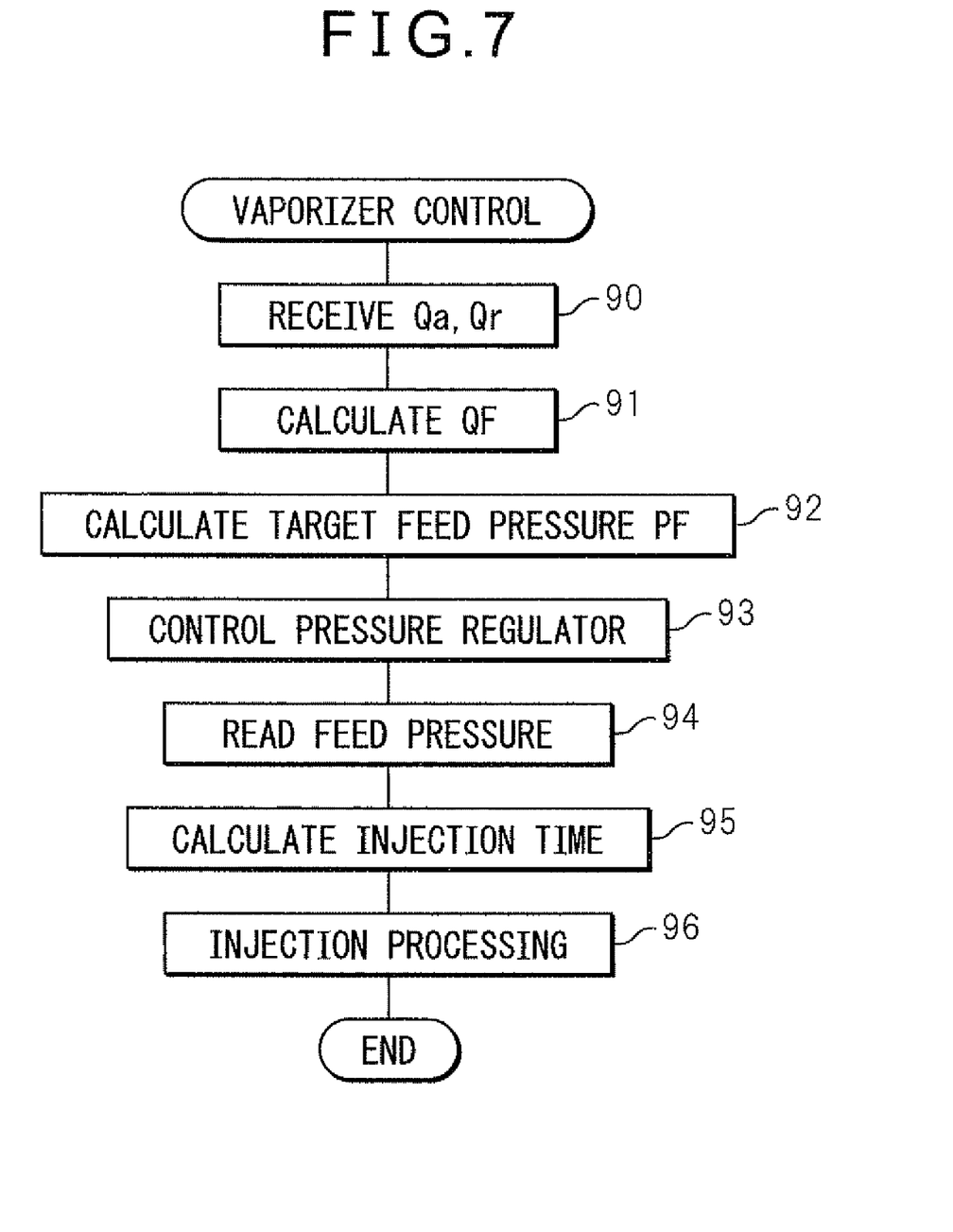
FIG. 7 is a flow chart showing still another embodiment for control of a vaporizer.

FIG. 7 shows a routine for control of the vaporizer performed at the electronic control unit II for working this embodiment. This routine is executed every time fuel is injected into a cylinder. Referring to FIG. 7, first of all, at step 90, the amount of gaseous ammonia injection $Q_a$ and the amount of reformed gas injection $Q_r$ calculated at step 51 of FIG. 2 are received. Next, at step 91, the amount of gaseous ammonia injection $Q_a$ and the amount of reformed gas injection Qr are converted to the amount of liquid ammonia QF.

Next, at step 92, based on the amount of liquid ammonia QF, the target pressure PF of the feed pressure of the liquid ammonia is calculated from the relationship shown in FIG. 6. At the next step 93, the regulator 26 is controlled so that the feed pressure of the liquid ammonia is made to become substantially the target pressure PF. Next, at step 94, the output of the pressure sensor 27 showing the feed pressure of the liquid ammonia 7 is read. Next, at step 95, the injection time from the vaporizer injectors 23 is calculated from the amount of liquid ammonia QF and this liquid ammonia feed pressure. At the next step 96, liquid ammonia is injected from the vaporizer injectors 23 in accordance with this injection time.

Next, still another embodiment shown in FIG. 8 will be explained. That is, when the temperature of the heating device 16 is low such as at the time of engine startup, even if feeding the vaporizer 3 liquid ammonia, there is the danger that this liquid ammonia will not be vaporized and as a result the vaporizer 3 will be filled with liquid ammonia. Therefore, in this embodiment, when the temperature of the heating device 16 is lower than a predetermined temperature, the feed of liquid ammonia to the vaporizer 3 is stopped or the amount of feed of liquid ammonia to the vaporizer 3 is made to fall.

Further, if the gas pressure in the vaporizer 3 becomes abnormally high, there is the danger that the ammonia will leak outside or the vaporizer 3 will break down. Therefore, in this embodiment, when the gas pressure $P_g$ in the vaporizer 3 exceeds a predetermined allowable upper limit pressure $P_{max}$, the feed of liquid ammonia into the vaporizer 3 is stopped or the amount of feed of liquid ammonia into the vaporizer 3 is made to fall.

Figure 8:
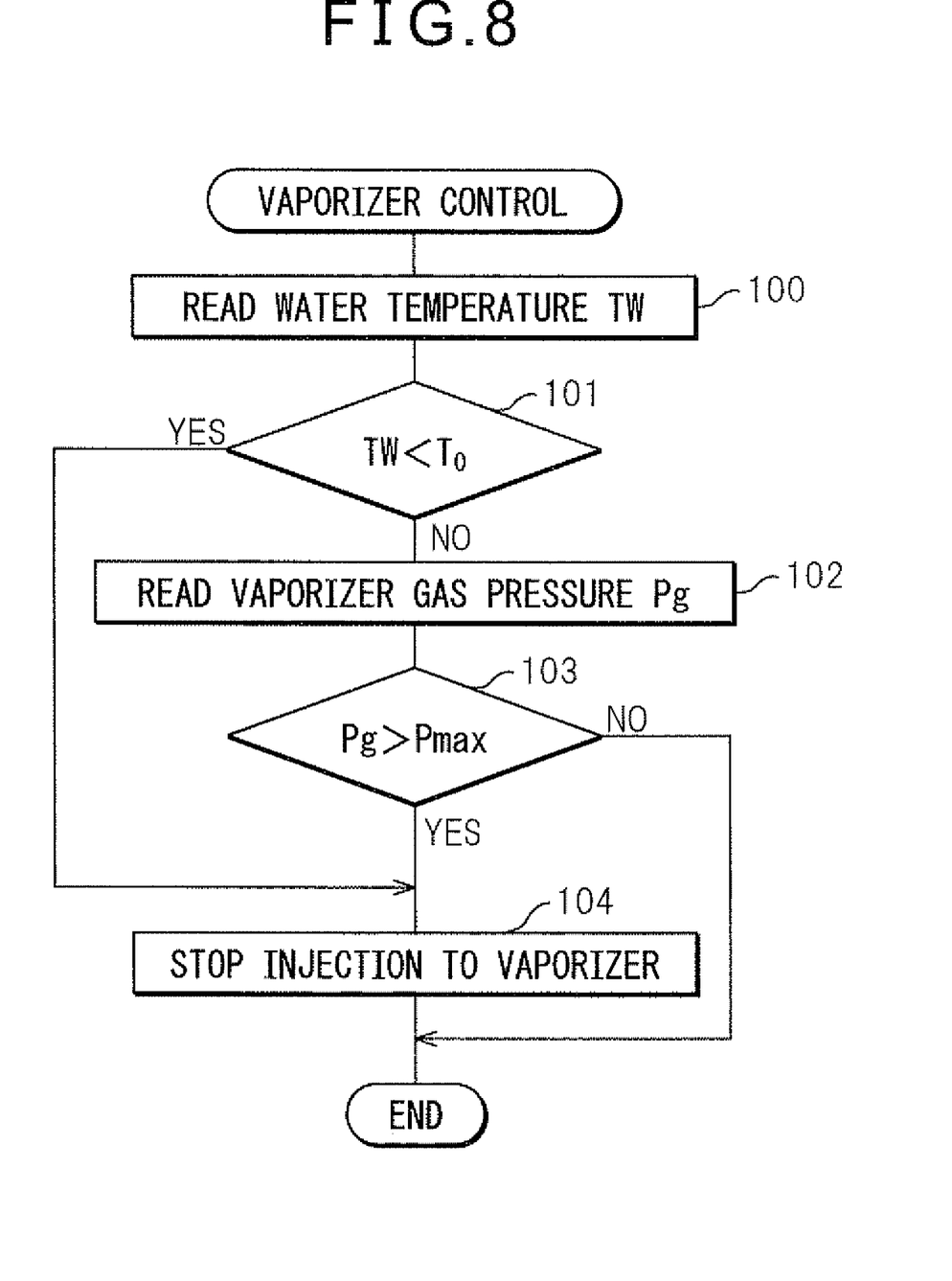
FIG. 8 is a flow chart showing still another embodiment for control of a vaporizer.

FIG. 8 shows the control routine of the vaporizer performed at the electronic control unit II for working this embodiment. This routine is executed by interruption every predetermined time interval. Referring to FIG. 8, first of all, at step 100, the output of the temperature sensor 21 showing the temperature TW of the cooling water flowing out from the heating device 16 is read. Next, at step 101, it is determined if this cooling water temperature TW is a predetermined setting temperature $T_0$ or less. When $TW<T_0$, it is judged that the temperature of the heating device 16 is lower than the predetermined temperature. The routine jumps to step 104 where the injection of liquid ammonia from the vaporizer injectors 23 is stopped.

On the other hand, when it is determined at step 101 that $TW \geq T_0$, the routine proceeds to step 102 where the output of the pressure sensor 28 showing the gas pressure $P_g$ in the vaporizer 3 is read. Next, at step 103, it is determined if the gas pressure $P_g$ in the vaporizer 3 exceeds an allowable upper limit pressure $P_{max}$. When $P_g > P_{max}$, the routine proceeds to step 104 where the injection of liquid ammonia from the vaporizer injectors 23 is stopped.

Figure 9:
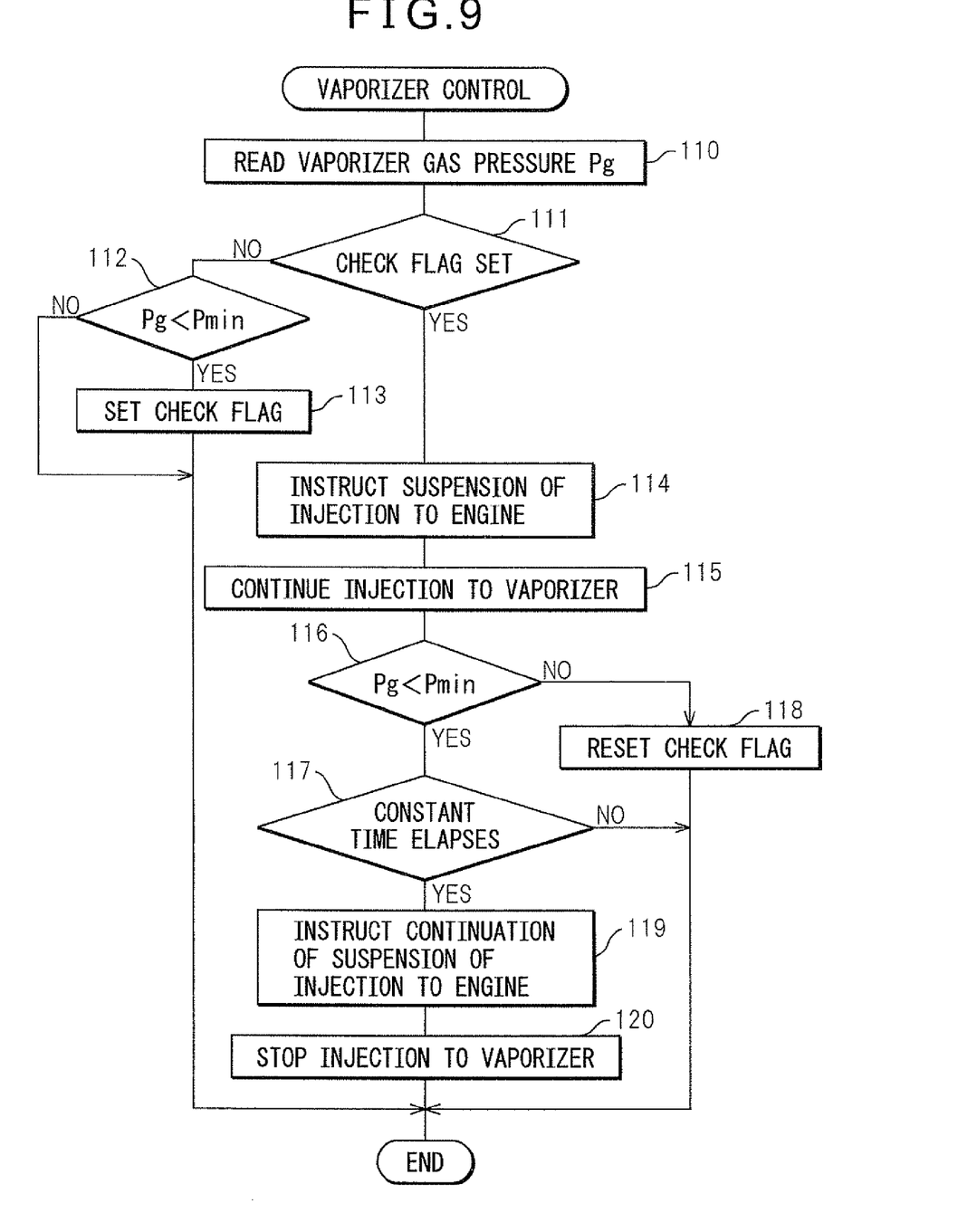
FIG. 9 is a flow chart showing still another embodiment for control of a vaporizer.

FIG. 9 shows still another embodiment. In this embodiment, despite the vaporizer 3 being fed liquid ammonia, when the gas pressure $P_g$ in the vaporizer 3 is a predetermined lower limit pressure $P_{min}$ or less, it is judged that the vaporizer 3 is leaking ammonia. At this time, the feed of liquid ammonia to the vaporizer 3 is stopped and the feed of ammonia from the ammonia injector 9 and the feed of reformed gas from the reformed gas injector 8 are stopped. That is, the operation of the ammonia injection system as a whole is stopped. At this time, the engine is driven only by gasoline.

FIG. 9 shows a vaporizer control routine performed in an electronic control unit II for executing this embodiment. This routine is performed by interruption every certain time interval. Referring to FIG. 9, first of all, at step 110, the output of the pressure sensor 28 showing a gas pressure $P_g$ in the vaporizer 3 is read. Next, at step 111, it is determined if a check flag showing that ammonia should be checked for leakage is set. This check flag is usually reset, so the routine proceeds to step 112 where it is determined if the gas pressure $P_g$ in the vaporizer 3 is lower than the lower limit pressure $P_{min}$. When $P_g < P_{min}$, the routine proceeds to step 113 where the check flag is set.

When the check flag is set, the routine proceeds from step 111 to step 114 where a command for stopping the injection of gaseous ammonia and reformed gas to the engine is sent to the electronic control unit I. Due to this, injection of gaseous ammonia from the ammonia injector 9 and injection of reformed gas from the reformed gas injector 8 are stopped. At this time, the engine is driven only by gasoline. Next, at step 115, the injection of liquid ammonia from the vaporizer injector 23 is continued. Next, at step 116, it is determined if the gas pressure $P_g$ in the vaporizer 3 continues to be lower than the lower limit pressure $P_{min}$. When $P_g \leq P_{min}$, the routine proceeds to step 117 where it is determined if a certain time has elapsed from when the check flag was set.

When it is determined at step 116 that $P_g \geq P_{min}$ up until a certain time has elapsed after the check flag is set, it is judged that ammonia is not leaking. At this time, the routine proceeds to step 118 where the check flag is reset. As opposed to this, when $P_g < P_{min}$ up until a certain time has elapsed after the check flag is set, it is judged that ammonia is leaking. At this time, the routine proceeds to step 119 where a command for continuing the suspension of injection of gaseous ammonia and reformed gas into the engine is sent to the electronic control unit I. At the next step 120, injection of liquid ammonia from the vaporizer injector 23 is stopped.

Figure 10:
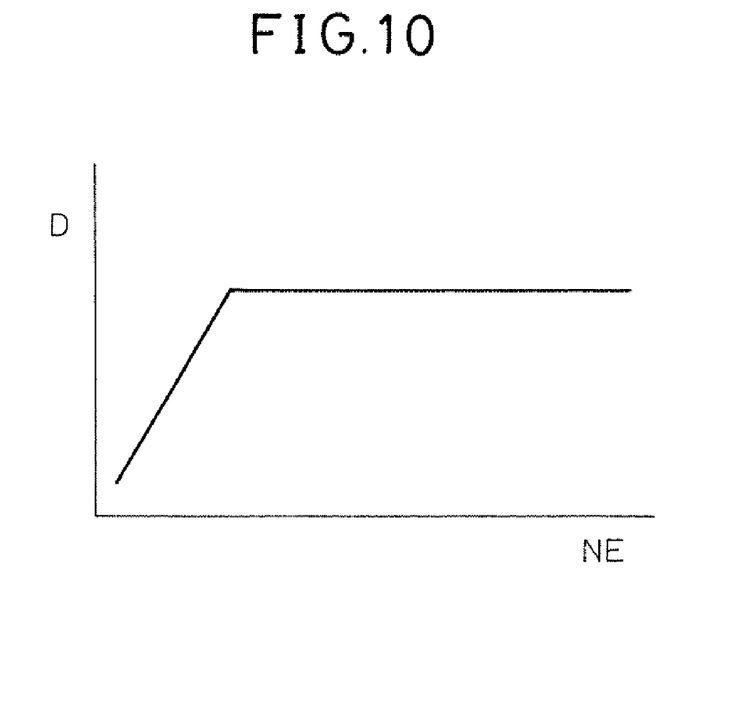
FIG. 10 is a view showing a duty ratio D.
Figure 11:
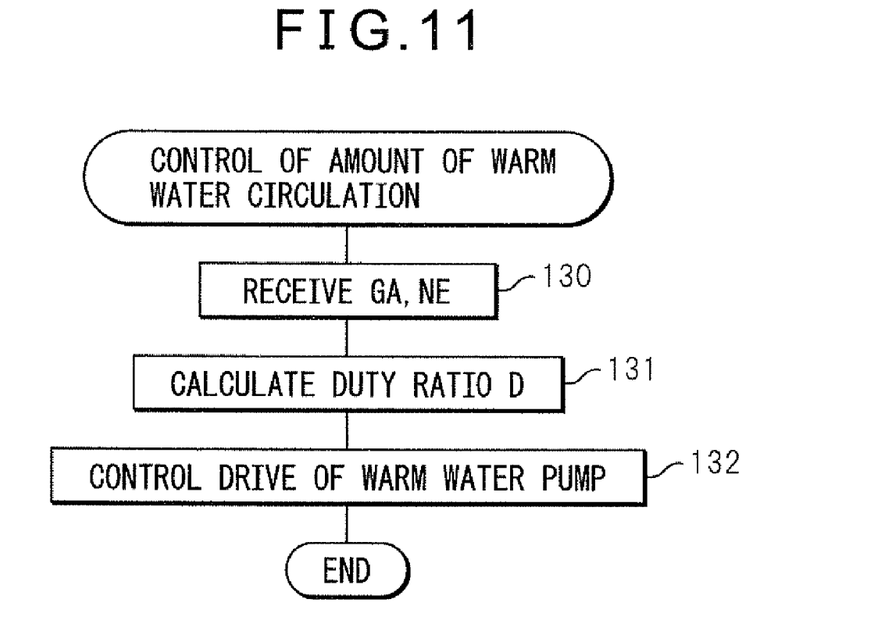
FIG. 11 is a flowchart for control of an amount of circulation of warm water.

FIG. 10 and FIG. 11 show still another embodiment. That is, when the vaporizer 3 is fed liquid ammonia, it is preferable to make the liquid ammonia efficiently vaporize by raising the heating power of the heating device 16. Therefore, in this embodiment, usually the duty ratio D of the drive voltage of the warm water pump 20 is made maximum and the amount of circulation of the engine cooling water is increased.

However, when the amount of consumption of liquid ammonia is small, that is, when the engine speed NE is low, the problem arises that if raising the heating power of the heating device 16, the pressure in the vaporizer 3 will end up becoming too high. Thus, in this embodiment, when the engine speed NE becomes lower, the duty ratio D is lowered to thereby weaken the heating force of the heating device 16. Note that, the relationship between the duty ratio D and engine speed NE shown in FIG. 10 is stored in advance.

FIG. 11 shows the control routine of the amount of circulation of warm water performed at the electronic control unit II for working this embodiment. This routine is executed by interruption every predetermined time interval. Referring to FIG. 11, first of all, at step 130, the amount of intake air GA and the engine speed NE are received. Next, at step 131, the duty ratio D of the drive voltage of the warm water pump 20 is calculated from FIG. 10. Next, at step 132, this duty ratio D is used to control the drive of the warm water pump 20.

While the invention has been described with reference to specific embodiments chosen for purpose of illustration, it should be apparent that numerous modifications could be made thereto by those skilled in the art without departing from the basic concept and scope of the invention.

The invention claimed is:

1. A control device of an internal combustion engine designed to feed liquid ammonia from an ammonia storage tank into a vaporizer to make the liquid ammonia vaporize and to feed gaseous fuel comprised of ammonia vaporized in the vaporizer or gaseous fuel comprised of ammonia vaporized in the vaporizer and reformed gas obtained by reforming this ammonia into a combustion chamber to burn the gaseous fuel in the combustion chamber, wherein at least one of an amount of feed of the liquid ammonia into the vaporizer, a feed pressure of the liquid ammonia to the vaporizer, and a gas pressure in the vaporizer is adjusted based on an amount of feed of said gaseous fuel into the combustion chamber.

2. A control device of an internal combustion engine as claimed in claim 1, wherein the amount of feed of the liquid ammonia into the is controlled so that the amount of liquid ammonia fed into the vaporizer is made equal to the amount of ammonia fed into the combustion chamber in the form of gaseous fuel.

3. A control device of an internal combustion engine as claimed in claim 2, wherein a target pressure of the gas pressure in the vaporizer is set and the amount of liquid ammonia fed into the vaporizer is controlled so that the gas pressure in the vaporizer is made to become said target pressure.

4. A control device of an internal combustion engine as claimed in claim 3, wherein said target pressure is made higher the greater the amount of feed of gaseous fuel into the combustion chamber.

5. A control device of an internal combustion engine as claimed in claim 1, wherein the feed pressure of the liquid ammonia in the vaporizer is made higher the greater the amount of feed of the gaseous fuel into the combustion chamber.

6. A control device of an internal combustion engine as claimed in claim 1, wherein a heating device is arranged in the vaporizer and when the temperature of the heating device is lower than a predetermined temperature, the feed of liquid ammonia to the vaporizer is stopped or the amount of feed of liquid ammonia to the vaporizer is made to fall.

7. A control device of an internal combustion engine as claimed in claim 1, wherein when the gas pressure in the vaporizer exceeds a predetermined allowable upper limit pressure, the feed of liquid ammonia to the vaporizer is stopped or the amount of feed of liquid ammonia to the vaporizer is made to fall.

8. A control device of an internal combustion engine as claimed in claim 1, wherein when the gas pressure in the vaporizer is a predetermined lower limit pressure or less regardless of the fact that liquid ammonia had been fed into the vaporizer, the feed of liquid ammonia to the vaporizer is stopped.

9. A control device of an internal combustion engine as claimed in claim 1, wherein a heating device is arranged in the vaporizer and when amount of feed of the liquid ammonia to the vaporizer is reduced, a heating power of the heating device is made to fall.

* * * * *